United States Patent
Patrick et al.

(10) Patent No.: US 9,791,352 B2
(45) Date of Patent: Oct. 17, 2017

(54) AUTOMATED PROGNOSTICS SYSTEMS AND METHODS

(71) Applicant: General Electric Company, Schenectady, NY (US)

(72) Inventors: Romano Patrick, Atlanta, GA (US); Sameer Vittal, Atlana, GA (US); Johan Michael Reimann, Niskayuna, NY (US)

(73) Assignee: General Electric Company, Schenectday, NY (US)

( * ) Notice: Subject to any disclaimer, the term of this patent is extended or adjusted under 35 U.S.C. 154(b) by 493 days.

(21) Appl. No.: 14/488,669

(22) Filed: Sep. 17, 2014

(65) Prior Publication Data

US 2016/0076976 A1    Mar. 17, 2016

(51) Int. Cl.
*G01M 99/00* (2011.01)
*G01M 15/00* (2006.01)
*G06F 19/00* (2011.01)
*G05B 23/02* (2006.01)

(52) U.S. Cl.
CPC .......... *G01M 99/005* (2013.01); *G01M 15/00* (2013.01); *G01M 99/008* (2013.01); *G05B 23/0224* (2013.01); *G05B 23/0283* (2013.01)

(58) Field of Classification Search
CPC .. G01M 15/00; G01M 99/005; G01M 99/008; G05B 23/0224; G05B 23/0283; G06N 99/005
USPC .......... 702/34, 182, 33, 36; 701/100; 703/2; 706/14
See application file for complete search history.

(56) References Cited

U.S. PATENT DOCUMENTS

| | | |
|---|---|---|
| 7,577,548 B1 | 8/2009 | Przytula et al. |
| 7,690,840 B2 | 4/2010 | Zombo et al. |
| 8,116,990 B2 | 2/2012 | Koul |
| 8,306,791 B2 | 11/2012 | Yerramalla et al. |
| 8,438,129 B1 | 5/2013 | Przytula et al. |

(Continued)

FOREIGN PATENT DOCUMENTS

EP    1217189 A1    6/2002

OTHER PUBLICATIONS

European Search Report and Opinion issued in connection with corresponding EP Application No. 15184301.8 on Apr. 7, 2016.

*Primary Examiner* — John H Le
(74) *Attorney, Agent, or Firm* — Eversheds Sutherland (US) LLP (57) ABSTRACT

An automated prognostics system includes a sensor system configured to obtain measurement data by monitoring one or more parameters at one or more locations on each of one or more movable components of an object when the object is subjected to a first mode of operation. The system also includes a computing device having an input interface and a processor. The input interface receives input information such as spatial coordinates information associated with the one or more locations, the measurement data obtained by the sensor system, operational data associated with the first mode of operation, and structural data associated with the object. The processor processes the input information and generates a prognostics report on at least a first component of the one or more movable components, the prognostics report including at least one of a failure prognostic or a likelihood-of-failure prognostic of the first component.

20 Claims, 8 Drawing Sheets (56) References Cited

U.S. PATENT DOCUMENTS

| | | |
|---|---|---|
| 8,442,778 B2 | 5/2013 | Bechhoefer et al. |
| 8,442,853 B2 | 5/2013 | Abbott |
| 8,471,702 B2 | 6/2013 | Babu et al. |
| 2009/0055070 A1 | 2/2009 | De et al. |
| 2012/0283963 A1 | 11/2012 | Mitchell et al. |
| 2013/0318018 A1 | 11/2013 | Kalya et al. |
| 2014/0046881 A1* | 2/2014 | Losl ............... G06N 99/005 706/14 |
| 2014/0244133 A1 | 8/2014 | De Prosperis et al. |

* cited by examiner

AUTOMATED PROGNOSTICS SYSTEMS AND METHODS

FIELD OF THE DISCLOSURE

This disclosure generally relates to prognostics, and more particularly, to automated prognostics systems and methods.

BACKGROUND OF THE DISCLOSURE

A moving object is typically subjected to a variety of forces and conditions that may adversely impact the integrity of the moving object. For example, various parts in an engine of a car may heat up when the car is set in motion. Some parts may heat up more than others depending on the way the car is driven and the conditions under which the car is driven. Engineers typically attempt to predict the extent of the heat generation in the various parts of the car under a variety of conditions before making the car available for sale to the general public.

In some cases, the effects of the heating may be readily apparent—either through visual observation of viewable moving parts or by the use of relatively simple test equipment. However, in some other cases, the nature of the heating and the adverse effects of the heating on the performance or longevity of a moving part (such as a piston, for example) may not be readily viewable and/or identifiable.

Consequently, engineers may resort to using a computer simulation procedure to replicate one or more possible scenarios in which a moving part may operate. However, as can be understood, it is difficult and complicated to theoretically predict all possible scenarios of operation for the moving part when executing the computer simulation procedure. Therefore, in some situations, engineers may opt to use a real-world test system in order to evaluate the operation of the part when the part is actually in motion. However, the voluminous amount of data that may be generated by a computer that is a part of this real-world test system makes it often difficult to analyze potential problems that may exist in a moving part and predict when and how the problematic moving part may fail.

BRIEF DESCRIPTION OF THE DISCLOSURE

Embodiments of the disclosure can address some or all of the needs described above. Embodiments of the disclosure are directed generally to automated prognostics systems and methods.

According to one example embodiment of the disclosure, an automated prognostics method can include subjecting an object comprising one or more movable components, to a first mode of operation, and using a sensor system to obtain measurement data by monitoring one or more parameters at one or more locations on each of the one or more movable components when the object is subjected to the first mode of operation. A computing device is then provided with input information such as spatial coordinates information associated with the one or more locations, the measurement data obtained by the sensor system, operational data associated with the first mode of operation, and structural data associated with the object. The computing device processes the input information and generates a prognostics report on at least one component. The prognostics report can include a failure prognostic and/or a likelihood-of-failure prognostic of the component.

According to another example embodiment of the disclosure, an automated prognostics system can include a sensor system that is configured to obtain measurement data by monitoring one or more parameters at one or more locations on each of one or more movable components of an object when the object is subjected to a first mode of operation. The system can also include a computing device that includes an input interface and a processor. The input interface is configured to receive input information such as spatial coordinates information associated with the one or more locations, the measurement data obtained by the sensor system, operational data associated with the first mode of operation, and structural data associated with the object. The processor is configured to process the input information received through the input interface and generate therefrom, a prognostics report on at least a first component of the one or more movable components, the prognostics report including a failure prognostic and/or a likelihood-of-failure prognostic of the first component.

According to yet another example embodiment of the disclosure, a computer-readable storage medium can be provided. The computer-readable storage medium has stored thereon, instructions executable by a computer for performing operations that can include receiving measurement data obtained by monitoring one or more parameters at a plurality of locations on each of one or more movable components of an object when the object is subjected to a first mode of operation; receiving operational data associated with the first mode of operation; receiving structural data associated with the object; and processing at least one of the measurement data, the operational data, and the structural data and generate therefrom, a prognostics report on at least a first component of the one or more movable components, the prognostics report including at least one of a failure prognostic or a likelihood-of-failure prognostic, of the first component.

Other embodiments and aspects of the disclosure will become apparent from the following description taken in conjunction with the following drawings.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION OF THE DISCLOSURE

The disclosure now will be described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will satisfy applicable legal requirements. Like numbers refer to like elements throughout.

Various words, terms and phrases are used herein for convenience of description, and as such these various words, terms and phrases should not be interpreted in a literal sense, but should instead be interpreted broadly by understanding the context in which the various example embodiments have been described. For example, the word "moving" as used herein can generally refer to an object that is in motion, while the word "movable" can generally refer to an object that is capable of motion. In some cases, these two words may be used interchangeably and when done so, the words should be interpreted in the appropriate context and spirit of the disclosure. The word "motion" (or "movement") as used herein may generally refer to various types of motions, such as for example, a rotary motion, a reciprocating motion, a vibrating motion etc. The word "actual" as used herein can generally refer to real-world parts and operations (in contrast to "virtual" or "synthesized" parts that are generated and manipulated in a computer). As yet another example, the word "replicated" should be understood to indicate multiple components that are substantially similar in structure and/or appearance to each other, but may or may not be exactly identical to each other in terms of various properties and behaviors.

Furthermore, it will be pertinent to point out that the prognostics systems and methods described in this disclosure may be interconnected with various types of diagnostics systems and methods that are also described herein. Consequently, it should be understood that the various example embodiments (and modifications thereof) of not only the prognostics systems and methods but also the diagnostics systems and methods are intended to be included within the scope of the appended claims.

Figure 1:
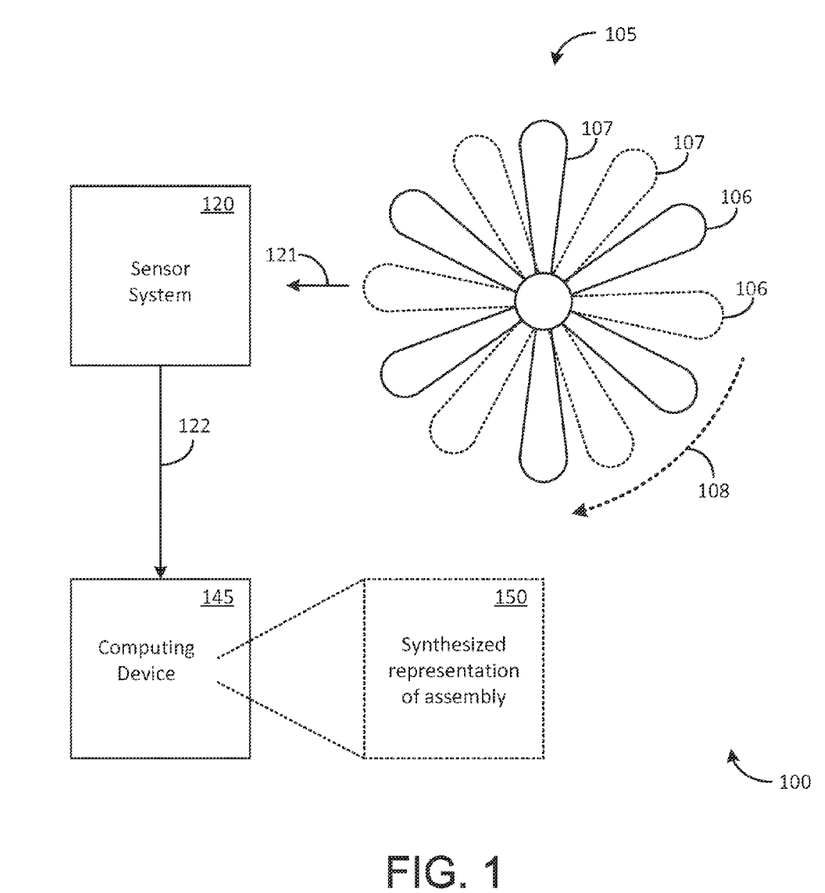
FIG. 1 illustrates an example functional block diagram representing an automated prognostics system according to an embodiment of the disclosure.

FIG. 1 illustrates an example functional block diagram representing an automated prognostics system 100 that can be used to assess various types of objects and provide prognostics results. For example, in one example implementation, the object can be an engine assembly having diverse and dissimilar movable components, while in another example embodiment the object can include dissimilar movable components as well as replicated movable components.

Nonetheless, purely as a matter of convenience for description purposes, the object shown in FIG. 1 is a turbine assembly 105 that includes several dissimilar components as well as several replicated components. The replicated components can include multiple blades, such as a first blade 106 and a second blade 107 that are shown in motion (via dashed line outlines of the blades) in a clockwise direction (arrow 108).

The dissimilar components may include various components (not shown) such as an engine, a cowling, a gear wheel, or a shaft of the turbine assembly. As can be understood these various dissimilar and/or replicated components can undergo various types of movement when the turbine assembly 105 is in operation. However, purely as a matter of convenience for description, one particular movement is referred to herein in the context of a rotary motion of the blades of the turbine assembly 105.

A sensor system 120 may be coupled to the turbine assembly 105 for purposes of obtaining measurement data associated with one or more components of the turbine assembly 105. More particularly, in accordance with the disclosure, the sensor system 120 may be used to monitor one or more dynamic parameters associated with one or more moving components of the turbine assembly 105.

Figure 2A:
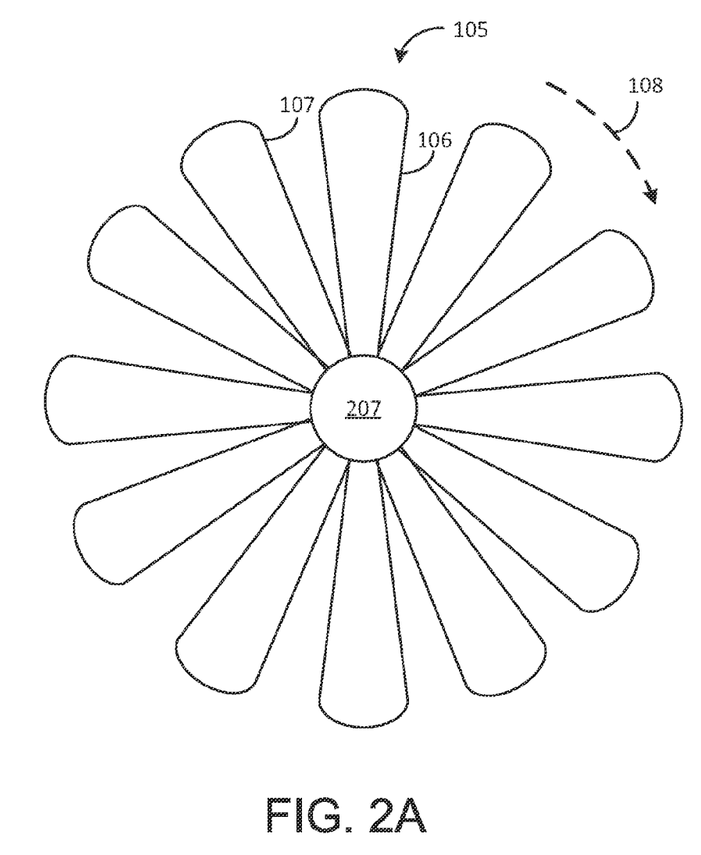
FIGS. 2A and 2B illustrate an example automated prognostics system comprising a sensor system coupled to an object in accordance with one embodiment of the disclosure.
Figure 2B:
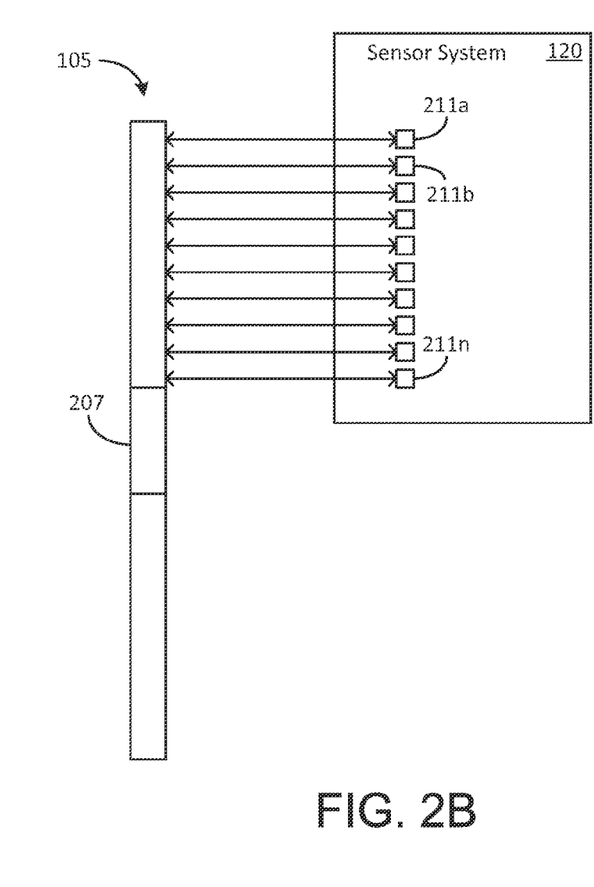

The sensor system 120 may be selected in accordance with the nature of the one or more dynamic parameters to be monitored. For example, when temperature is the dynamic parameter of interest, the sensor system 120 may include various temperature sensing elements such as for example, thermocouples or infrared sensors. Some additional details of the sensor system 120 are provided below (with reference to FIG. 2).

The computing device 145, which is communicatively coupled to the sensor system 120 via a communication link 122 for receiving measurement data, may be also used to receive a query from a user (not shown). The query may pertain to one or more aspects related to one or more of the moving components. For example, the user may desire to know when a particular moving component, say a blade of the turbine assembly 105, is likely to fail and also an expected nature of the failure (catastrophic failure, partially failure etc.).

In one example embodiment, the user may desire to know if the first blade 106 of the turbine assembly 105 will fail before the second blade 107, and if so, which specific portion of the first blade 106 will fail.

In response to the query, the computing device 145 can obtain various forms of input information such as for example, spatial coordinates information associated with a plurality of monitored locations; measurement data derived from the sensor system 120; operational data associated with one or more modes of operation of the turbine assembly 105; and/or structural data associated with some or all components of the turbine assembly 105.

The spatial coordinates information and the measurement data derived from the sensor system 120 can include information related to various dynamic parameters that are measured at various locations on each of the first blade 106 and the second blade 107 for example.

The operational data associated with the particular mode of operation may include various items, such as for example, dynamic and static parameters relating to the manner in which the turbine assembly 105 is operated (speed, load, power consumption etc.), and/or various environmental parameters (ambient temperature, humidity, etc.).

The structural data may include data related to, for example, pre-existing conditions of various components (the second blade 107 may be newer than the first blade 106, for example).

The computing device 145 can use the spatial coordinates information, the measurement data, the operational data, and/or the structural data to generate a computerized representation of at least the first blade 106 and the second blade 107. The computerized representation of the two turbine blades may be then used by the computer system 145 to generate a synthesized representation of the entire turbine assembly 105. The synthesized representation of the turbine assembly 105 provides various kinds of information pertaining to the turbine assembly 105 as a whole, and/or of specific moving components, when the turbine assembly 105 is operated in a particular manner that may be desired by the user and indicated as such in the input query. For example, the synthesized representation of the turbine assembly 105 may provide an indication that the first blade is running hotter than the second blade, and in particular that there is a hotspot close to a leading edge of the first blade, when the turbine assembly 105 is operating in the specific manner indicated in the input query.

It will be pertinent to point out that the measurement data that is provided by the sensor system 120 to the computer system 145 is quantitatively too large for direct processing by a human being without the use of a computer. This aspect will now be addressed in further detail using FIGS. 2A and 2B.

FIGS. 2A and 2B illustrate an example automated prognostics system in which a sensor system is coupled to an object in accordance with one embodiment of the disclosure. More particularly, FIG. 2A shows a front view of the object (which in this example embodiment is the turbine assembly 105), and FIG. 2B shows a side view of the turbine assembly 105 coupled to the sensor assembly 120.

As indicated above, the turbine assembly 105 may include one or more non-replicated components (for example, a shaft or a piston) and may also include one or more replicated components (for example, a set of blades). Some or all of the non-replicated components and the replicated components are movable components that may move in various ways when the turbine assembly 105 is in operation.

When placed in a first operating mode, the turbine assembly 105 rotates at a certain speed in a clockwise direction (as indicated by the arrow 108). The speed may be set by an operator (not shown) to a predetermined number of rotations per minute (rpm).

In this example embodiment, the turbine assembly 105 has "m" blades that rotate at "r" rpm during the first operating mode. Let it be further assumed that the dynamic parameter of interest is the temperature of one or more of the "m" blades when the turbine assembly 105 is rotating at "r" rpm. Consequently, the sensor system 120 is selected to be a temperature sensing system, such as for example, an infrared camera.

Such an infrared camera can include a set of "n" sensing elements 211 (indicated as 211a, 211b . . . 211n) that are oriented to capture temperature values from a number of locations on each blade of the set of blades of the turbine assembly 105 that is in a rotation mode of operation. At a first instance in time, the first blade 106 is aligned with the set of "n" sensing elements 211, thereby permitting the set of "n" sensing elements 211 to monitor and capture temperature parameters of the first blade 106.

At a second instance in time, as the blades rotate clockwise, the first blade 106 moves out of the way and the second blade 107 is now aligned with the set of "n" sensing elements 211 thereby permitting the set of "n" sensing elements 211 to monitor and capture temperature parameters of the second blade 107. At a third instance in time, the second blade 107 moves out of the way and the next blade is now aligned with the set of "n" sensing elements 211 thereby permitting the set of "n" sensing elements 211 to monitor and capture temperature parameters of this next blade. This process is repeated as each of the "m" blades cyclically move into a monitoring position that is aligned to the set of "n" sensing elements 211.

As can be understood, the set of "n" sensing elements 211 capture "n" temperature values for each of the "m" blades that are rotating at "r" rpm, which translates to a data capture rate of "m×r×n" temperature readings per minute.

Generally "n" is a large number (a multiple of $10^6$ in some implementations) that can correspond to the number of pixels in an infrared camera having a desirable level of resolution (for example, several megapixels), and "r" for a turbine assembly can be a large number as well (a multiple of $10^3$ in some implementations). Consequently, it can be understood that the data capture rate ("m×r×n" per minute) can be too high for a human being to process in real time and it therefore becomes necessary to use a computer for performing automated prognostics in accordance with the disclosure.

While the embodiment shown in FIG. 2B has been described above with reference to a temperature-related application, in other applications, other dynamic parameters such as for example, mechanical parameters (such as stress, shear, compression, expansion etc.), electrical parameters (current, voltage, power etc.), electro-mechanical parameters (power generating components for example), chemical parameters (chemical composition, chemical changes, etc.), and/or material parameters (rust, fractures, holes, etc.) may be monitored and analyzed using a correspondingly suitable sensor system 120 having appropriate sensing elements (mechanical, electrical, electro-mechanical, chemical, optical, photovoltaic, audio, and/or materials sensing elements).

Figure 3:
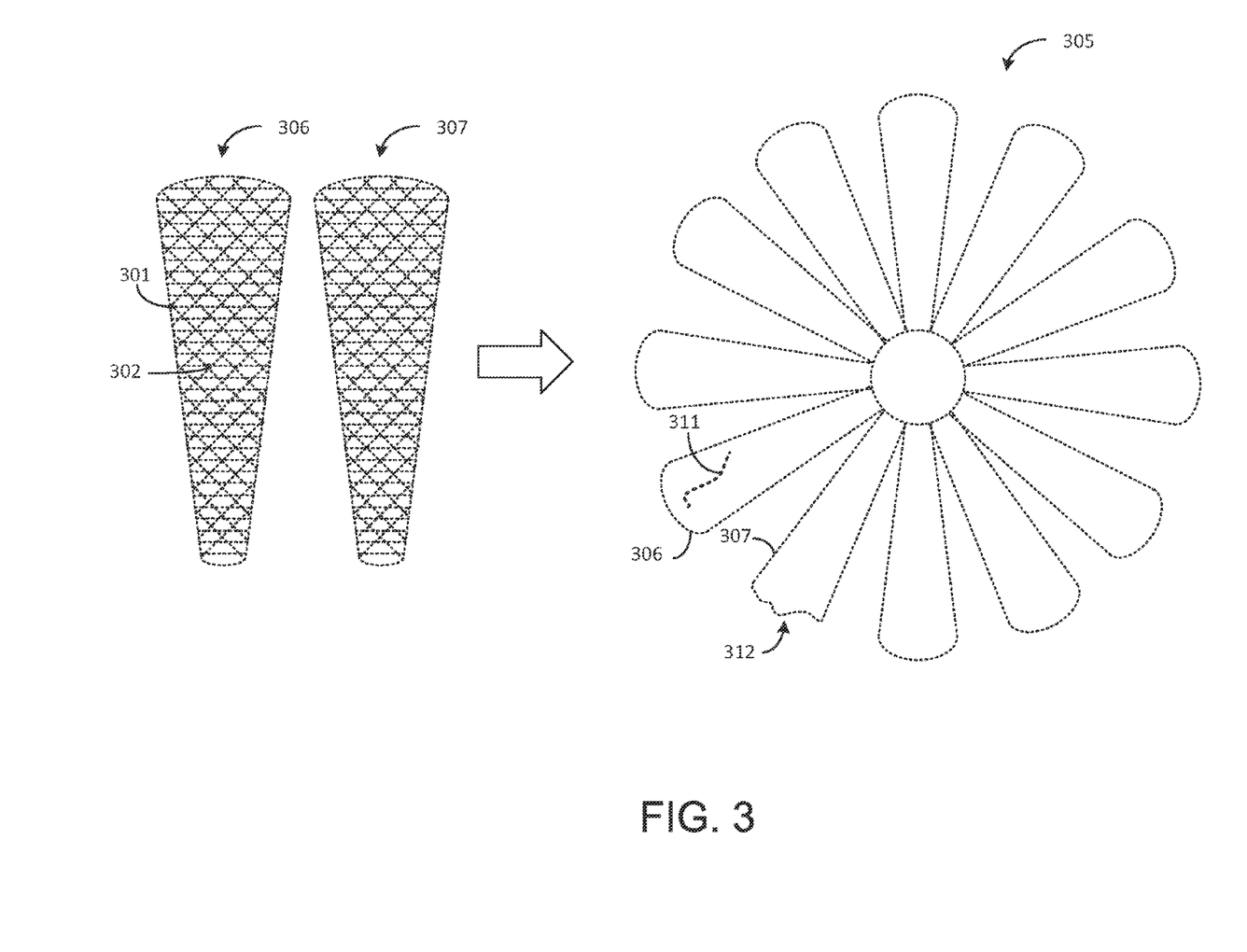
FIG. 3 illustrates an example procedure for generating a synthesized representation of an object in accordance with one embodiment of the disclosure.

FIG. 3 illustrates an example procedure for generating a synthesized representation 305 of the turbine assembly 105 in accordance with one embodiment of the disclosure. Referring back to FIGS. 1, 2A, and 2B, the sensor system 120 monitors and/or measures one or more dynamic parameters of the turbine assembly 105 and provides this measurement data to the computing device 145. In this example embodiment, the sensor system 120 monitors the set of blades using the set of "n" sensing elements 211 and not only provides the measurement data (for example, the measured temperature data for each of the set of blades) to the computing device 145 but may also provide to the computing device 145, spatial coordinates information pertaining to the set of sensing elements 211.

As can be understood, the spatial coordinates information pertaining to the set of "n" sensing elements 211 may be provided to the computing device 145 directly from the sensor system 120 or indirectly using other elements (not shown) such as another computer. The spatial coordinates information pertaining to the set of "n" sensing elements 211 may include three-dimension (3D) or two-dimensional (2D) coordinates information of each sensing element in the set of "n" sensing elements 211. Furthermore, the spatial coordinates information provided to the computing device 145 can not only pertain to the set of "n" sensing elements 211 but may also include additional spatial coordinates information pertaining to the set of blades and/or the turbine assembly 105. For example, the additional spatial coordinates information may pertain to dimensional information, materials characteristics information, assembly information, structural information, shape information etc. of one or more blade of the set of blades.

The computing device 145 can use the measurement data and the spatial coordinates information to generate a computerized representation of various components of the turbine assembly 105, such as for example, the first blade 106 and the second blade 107. Each of the computerized representations of the various components can be a three-dimensional (3D) graphical rendering.

Further details pertaining to this aspect will now be described using computerized representation 306 as an example element. As indicated by the dashed lines, the computerized representation 306 is a 3D graphical rendering of the first blade 106. In some example embodiments, the computerized representation 306 can be provided as a grayscale image while in other example embodiments, the computerized representation 306 can be provided as a color image. For example, when the computerized representation 306 is directed at providing temperature information, a color image can be rendered using a spectrum of heat related colors, with shades of red indicating higher temperatures and shades of blue indicating relatively cooler temperatures.

Each point on the surface of computerized representation 306 represents a combination of spatial coordinates information and measurement data. Thus, for example, the point 301 can be a graphical representation of a specific location on the actual first blade 106 coupled with temperature data for that location. Similarly, the point 302 is a graphical representation of another specific location on the actual first blade 106 and represents the temperature data for this other specific location. As can be understood, the point 301 is located close to a trailing edge of the blade 106 when the turbine assembly 105 is rotating clockwise and may therefore be cooler than another point 302 that is located towards the center of the blade 106. Consequently, the point 301 may be rendered in a dark shade of blue while the point 302 may be rendered in a dark shade of red to provide a visual representation of point 302 being hotter than point 301.

The computing device 145 may also use the computerized representation 306 and the computerized representation 307 to generate a synthesized representation 305 of the actual turbine assembly 105. The spatial coordinates information and the measurement data embedded in the computerized representations 306 through 307 are transferred to the synthesized representation 305 thereby providing a visual representation of various anomalies and/or difference characteristics, and/or similarities characteristics that may be present in various blades of the set of blades of the turbine assembly 105 when the turbine assembly 105 is in the operating mode described above with respect to FIGS. 2A and 2B. Furthermore, in addition to the spatial coordinates information, the computing device 145 may also be provided with operational data associated with the operating mode, and/or structural data associated with various components of the turbine assembly 105.

Certain areas of the blades of the synthesized representation 305 may be rendered as areas having certain characteristics that are different from other areas. For example, an area 311 may be indicated as a wavy line, thereby providing a visual indication to a human viewer that area 311 is a cracked area. In some example embodiments, the wavy line indication of area 311 may represent an area that is likely to develop a crack after a certain predictable period of time. The computing device 145 may also use information derived from the area 311 to provide various failure mode information such as for example, an expected reduction in the life expectancy of the first blade 106.

On the other hand, area 312 on the representation of the second blade 307 may be indicative of a break (or a potentiality of an occurrence of a break). Other such visual indicators provide a variety of automated prognostics results when the turbine assembly 105 is subjected to various operating modes in accordance with the disclosure.

Figure 4:
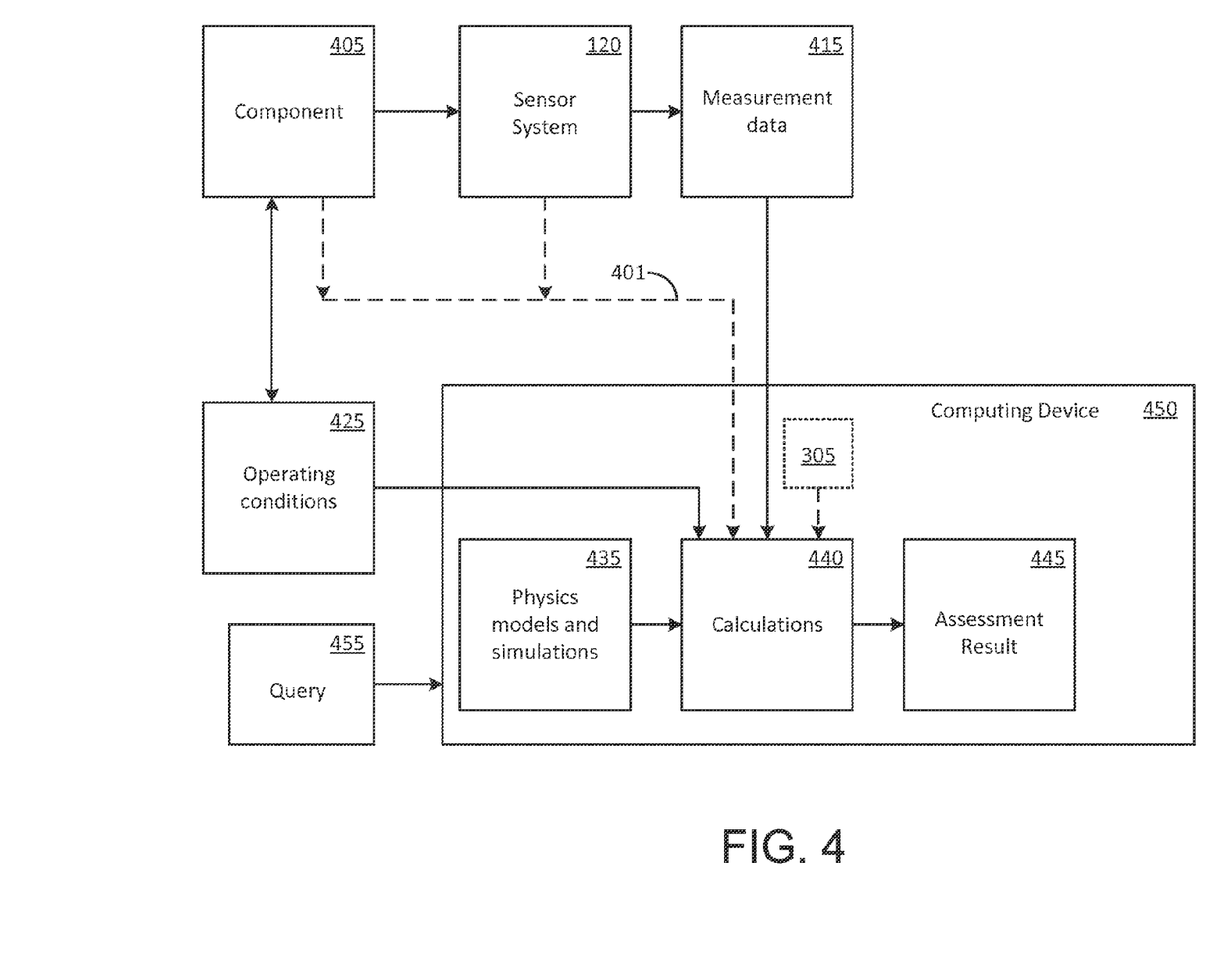
FIG. 4 illustrates example functional blocks pertaining to a method of automated prognostics that is executable on a computing device according to an embodiment of the disclosure.

FIG. 4 illustrates example functional blocks pertaining to a method of automated prognostics that is executable on a computing device according to an embodiment of the disclosure. Component 405, which may be an object such as for example, the turbine assembly 105 that includes multiple moving components as well as non-moving components, or may be one moving component (such as the first blade 106) that is a part of an object and can be set in motion in accordance with one or more operating conditions 425. In one example implementation, the one or more operating conditions 425 may be defined on the basis of a query 455 that is provided to a computing device 450.

The sensor system 120 is applied to the component 405 (such as in the manner described above with reference to FIG. 2B) and the resulting measurement data 415 is provided to the computing device 450. The computing device 450 can also be provided with spatial coordinates information and/or operating modes information (as indicated by the dashed line 401) from the component 405 and/or the sensor system 120, and/or other elements (not shown).

The computing device 450 may be further provided with information pertaining to the operating conditions 425 and/or or information derived from the synthesized representation 305 (shown in FIG. 3).

The computing device 450 can use one or more of the provided inputs in combination with the physics models and simulations 435 to perform various calculations 440. In some embodiments, the calculations may be carried out in response to the input query 455 that is initiated by a requester who desires to obtain certain prognostics information pertaining to the component 405.

The physics models and simulations 435 may include various types of theoretical predictions and calculations that are executable in the computing device 450 and/or in other computing elements. For example, in one example embodiment, the physics models and simulations 435 can include theoretical parameters associated with the component 405 when the component 405 is subjected to certain modes of operation, such as for example in the case of a turbine assembly 105, a particular operating speed, a particular load profile, and/or a level of output power generation of the turbine assembly.

In another example embodiment, the physics models and simulations 435 can include historical and/or predictive parameters associated with the component 405, such as for example, how was the component 405 used in the past, and/or how is the component 405 expected to be used in the future, and/or statistical data associated with components that are similar/identical to the component 405 (for example, in a batch manufactured set of components).

In yet another example embodiment, the physics models and simulations 435 can include parameters associated with failures. For example, such parameters may pertain to various conditions that can lead to various types of failures; expected time of occurrence of a certain type of failures; expected nature of a certain type of failures; statistical data associated with one or more types of failures (for example, the odds of occurrence of a crack, of a fracture, of a deformation, of a breakage, etc.); and/or which portion of a component (such as the component 405) is more likely to fail than another portion of the same component.

Certain technical effects and/or solutions can be provided by embodiments of the disclosure, such as the assessment result 445, which that is generated as a result of the calculations 440 provided to a display system (not shown)

and may pertain to various types of information such as for example, information associated with one or more operations of the component 405 in view of the input query 455; predictive information pertaining to various operating modes of the component 405; predictive information pertaining to various failures of the component 405; suggestions or recommendations such as for example, how to pre-empt, delay, and/or remedy certain types of failures; and/or information pertaining to end-of-life of the component 405.

Figure 5:
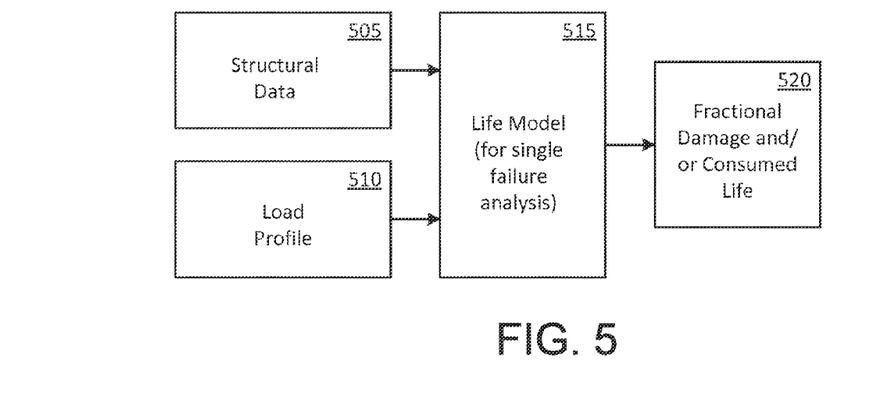
FIG. 5 illustrates some example functional blocks pertaining to a first method of automated prognostics that is executable on a computing device according to an embodiment of the disclosure.

FIG. 5 illustrates some example functional blocks pertaining to another method of automated prognostics that is executable on a computing device according to an embodiment of the disclosure. This method, which is generally directed to a deterministic calculation of fractional damage and/or consumed life 520 for a specific portion of a component, incorporates the use of a life model 515 for single failure analysis. The deterministic calculation of fractional damage, which may be referred to alternatively as calculation of "imputed" damage, can involve the application of time-limited loads, stress temperatures, operating conditions and/or other relevant physical variables that remain substantially stable or bounded with a time frame of the calculation.

Input information that is applied to the life model 515 includes structural data 505 and a load profile 510. The structural data 505 can include various types of instantaneous state descriptors such as for example operational data, calculations, structural conditions, and/or sensor data. The load profile 510 is indicative of one or more operating conditions and one or more physical loads that are imposed on the component.

Figure 6:
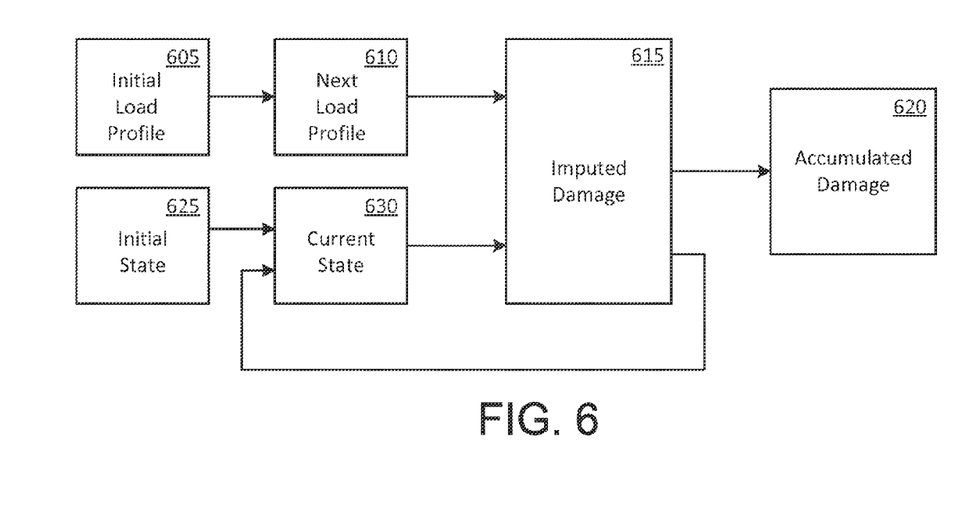
FIG. 6 illustrates some example functional blocks pertaining to a second method of automated prognostics that is executable on a computing device according to an embodiment of the disclosure.

FIG. 6 illustrates some example functional blocks pertaining to yet another method of automated prognostics that is executable on a computing device according to an embodiment of the disclosure. This method is generally directed to a deterministic calculation of accumulated damage 620 for a specific portion of a component. However, this method can also be used for deterministic calculations pertaining to a component in its entirety, various uncertainties in load tolerances, and/or various operating conditions. In a first iteration, an initial load profile 605 can be used to generate a next load profile 610, which is used in conjunction with a current state 630 of the component in order to calculate imputed damage 615. In the first iteration, the current state 630 can be generated from an initial state 625 and the next load profile 610 can be generated from an initial load profile 605.

Upon completion of the first iteration, the imputed damage 615 can be updated based on updating of the next load profile 610 and the current state 630. The updating of the next load profile 610 and the current state 630 occurs as time progresses and successive iterations for calculating the imputed damage 615 correspond to this progression in time.

The accumulated damage 620, which can be obtained from the imputed damage 615 after the passage of any desired time period, can be used for a variety of purposes such as failure analysis of the component, component maintenance, failure prevention procedures, component repair procedures, and/or component redesign procedures.

Figure 7:
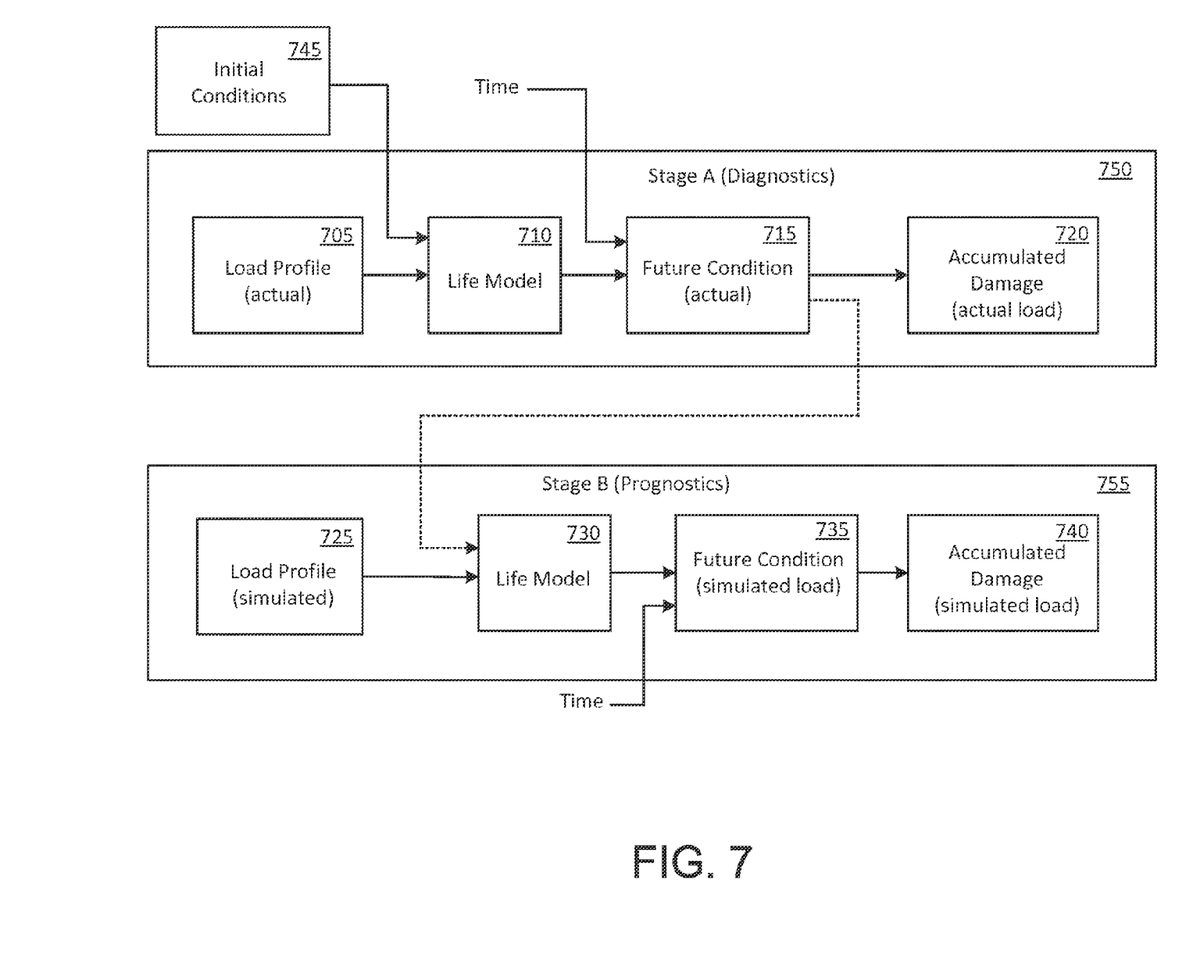
FIG. 7 illustrates some example functional blocks pertaining to a third method of automated prognostics that is executable on a computing device according to an embodiment of the disclosure.

FIG. 7 illustrates some example functional blocks pertaining to one more method of automated prognostics that is executable on a computing device according to an embodiment of the disclosure. The method can be divided into a stage A 750 containing several functional blocks directed at diagnostics operations, and a stage B 755 containing several functional blocks directed at prognostics operations. Stage B 755 is an optional stage that may be executed if prognostics are desired and omitted if not.

Stage A 750 includes a life model 710 that may be similar to the physics models and simulations 435 described above. However, the life model 710 can be primarily directed at parameters that pertain to time-of-life of a component. The time-of-life may be defined in various ways, such as for example, a definition of an amount of degradation in performance of the component when the component is subjected to various activities in various operating modes over a certain period of time. As can be understood, the nature of the various activities and the various operating modes affect the degradation of the component over the period of time.

For example, continuously operating a turbine assembly at a certain load condition for say ten years may cause a moving component of the turbine assembly, a blade for example, to deteriorate in structural integrity to 50% of its original specifications. Stage A 750 may be executed to predict the extent of such deterioration over the ten year period, while stage B 755 may be executed so as to address and/or remedy this deterioration beforehand.

For example, stage B 755 may be executed so as to identify actions that can be taken and/or elements that may be modified in order to change the deterioration of structural integrity of the blade from say 50% of the original specifications to say 25% of the original specifications over the same ten years. Alternatively, stage B 755 may be executed so as to identify actions that can be taken and/or elements that may be modified in order to change the deterioration of structural integrity of the blade from 50% of its original specifications in ten years to the same level of deterioration in say fifteen years.

The life model 710 is provided with information pertaining to the initial conditions 745 of a component (such as the current condition of a blade of a turbine assembly) and is also provided a load profile 705 that the component is actually subjected to (such as a speed of rotation of the blade, and/or a level of power generated by the turbine assembly). The execution of the life model 710 provides information pertaining to the future condition 715 of the component based on actual operating conditions of the component. The future condition 715 may change over various periods of time. The time period may be defined in an input query that is provided to the computing device on which stage A 750 is executed. Accumulated damage 720 may be calculated over various time periods.

Stage B 755 includes a life model 730 that may be similar to the life model 710. While the life model 710 is provided with actual real-world inputs, the life model 730 is provided with one or more simulated inputs, for example a load profile 725, which may be a predicted load profile or a desired load profile for example. The life model 730 can also be provided with information from the future condition 715 that represents of actual conditions that the component is exposed to.

The future condition 735 of stage B 755 provides information of various conditions of the component under the simulated conditions defined in the load profile 725. The future condition 735 may change over various periods of time. The time period may be defined in an input query that is provided to the computing device on which stage B 755 is executed. Accumulated damage 740 may be calculated over various time periods.

Figure 8:
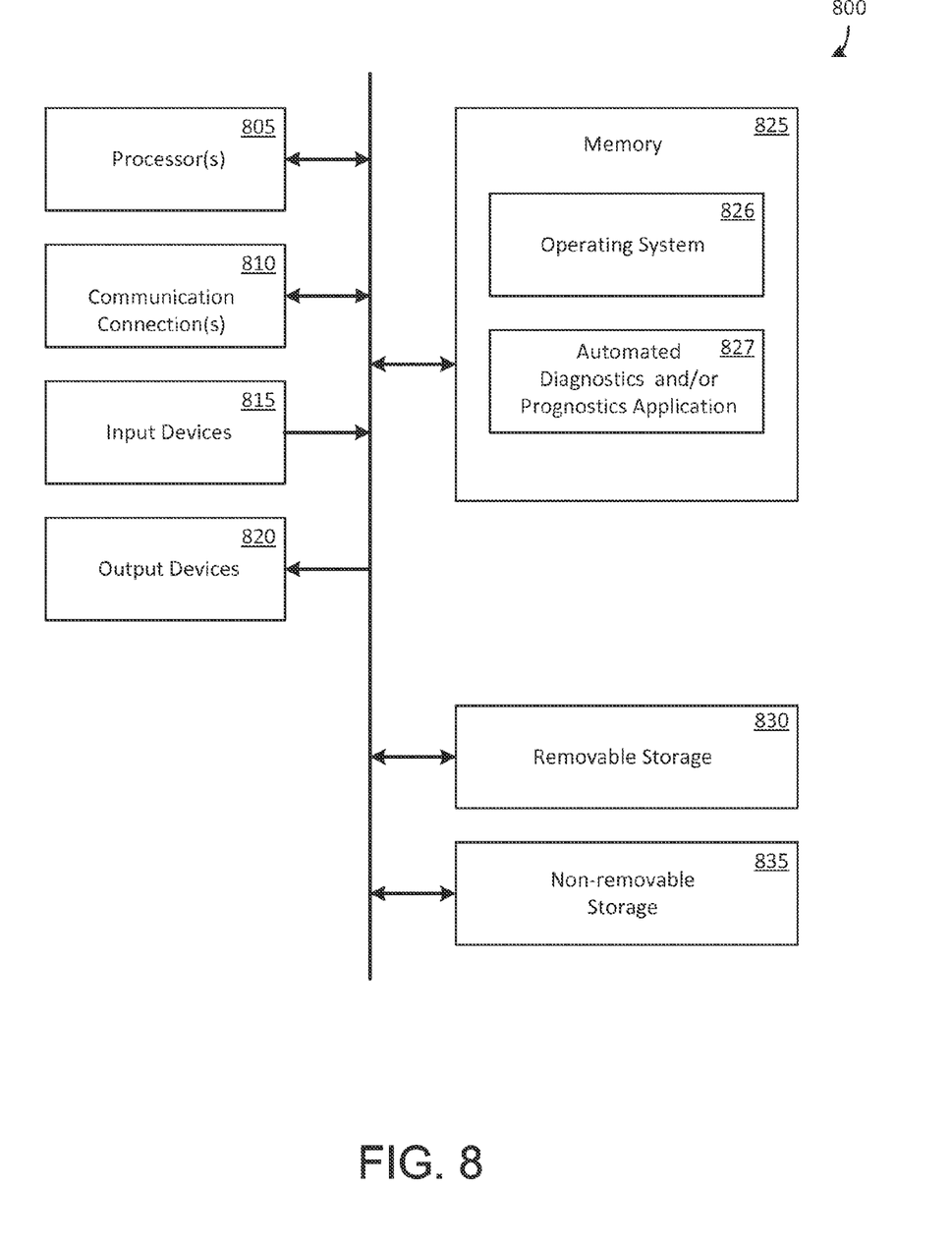
FIG. 8 illustrates an example computer incorporating a processor for executing a method of automated prognostics according to an embodiment of the disclosure.

FIG. 8 illustrates an example computer 800 for executing a method of automated prognostics according to an embodiment of the disclosure.

Computer 800 may include one or more processors 805 capable of communicating with a memory 825. The one or more processors 805 may be implemented and operated using appropriate hardware, software, firmware, or combinations thereof. Software or firmware implementations may include computer-executable or machine-executable instructions written in any suitable programming language to perform the various functions described. In one embodiment, instructions associated with a function block language may be stored in the memory 825 and executed by the one or more processors 805.

A memory 825 may be used to store program instructions that are loadable and executable by the one or more processors 805, as well as to store data generated during the execution of these programs. Depending on the configuration and type of computer 800, memory 825 may be volatile (such as random access memory (RAM)) and/or non-volatile (such as read-only memory (ROM), flash memory, etc.). In some embodiments, the memory devices may also include additional removable storage 830 and/or non-removable storage 835 including, but not limited to, magnetic storage, optical disks, and/or tape storage. The disk drives and their associated computer-readable media may provide non-volatile storage of computer-readable instructions, data structures, program modules, and other data for the devices. In some implementations, memory 825 may include multiple different types of memory, such as static random access memory (SRAM), dynamic random access memory (DRAM), or ROM.

The memory 825, removable storage 830, and non-removable storage 835 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

Computer 800 may also include one or more communication connections 810 that may allow a control device (not shown) to communicate with devices or equipment capable of communicating with the computer 800. The connections can be established via various data communication channels or ports, such as USB or COM ports to receive cables connecting the control device to various other devices on a network. In one embodiment, the control device may include Ethernet drivers that enable the control device to communicate with other devices on the network. According to various embodiments, communication connections 810 may be established via a wired and/or wireless connection on the network.

The computer 800 may also include an input interface in the form of one or more input devices 815, such as a keyboard, mouse, pen, voice input device, and touch input device. It may further include one or more output devices 820, such as a display, printer, and speakers. The display can be used to display a synthesized representation of an object in a visual format that is interpretable by a human being to derive information associated with one or more parameters of interest in accordance with the disclosure.

In other embodiments, however, computer-readable communication media may include computer-readable instructions, program modules, or other data transmitted within a data signal, such as a carrier wave, or other transmission. As used herein, however, computer-readable storage media do not include computer-readable communication media.

Turning to the contents of the memory 825, the memory 825 may include, but is not limited to, an operating system (OS) 826 and one or more application programs or services for implementing the features and aspects disclosed herein. Such applications may include an automated diagnostics and/or prognostics application 827, which may be implemented by software that is provided in configurable control block language and is stored in non-volatile memory. When executed by one or more processors 805, the automated diagnostics and/or prognostics application 827 implements the various functionalities and features described in this disclosure.

Figure 9:
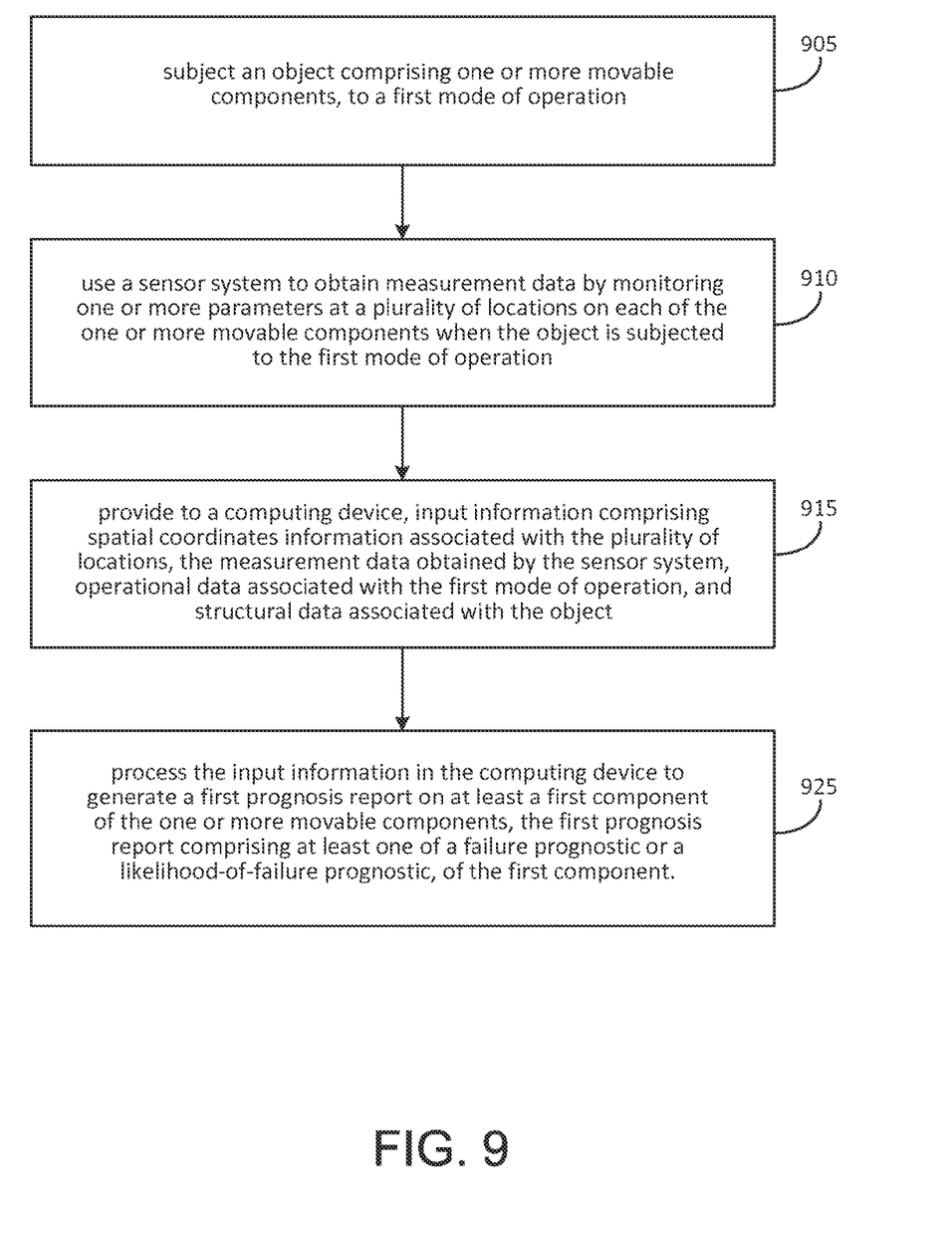
FIG. 9 illustrates a flow chart pertaining to a method of automated prognostics that is executable on a computing device according to an embodiment of the disclosure.

FIG. 9 illustrates a flow chart pertaining to a method of automated prognostics according to an embodiment of the disclosure. In block 905, an object comprising one or more movable components is subjected to a first mode of operation. In block 910, a sensor system may be used to obtain measurement data by monitoring one or more parameters at a plurality of locations on each of the one or more movable components when the object is subjected to the first mode of operation. In block 915, a computing device may be provided input information such as for example, spatial coordinates information associated with the plurality of locations, the measurement data obtained by the sensor system, operational data associated with the first mode of operation, and structural data associated with the object.

In block 925, the input information is processed in the computing device for generating a first prognostics report on at least a first component of the one or more movable components, the first prognostics report comprising at least one of a failure prognostic (or a likelihood-of-failure prognostic) of the first component.

In summary, it may be pertinent to point out that the disclosure is generally directed to assessment and/or prognostics procedures. The assessment may be carried out by using a plurality of sensing elements to obtain measurement data at a number of locations on one or more moving components, and by combining the measurement data with spatial coordinates information of the sensing elements so as to generate a computerized representation of the one or more moving components. The computerized representation, which can be a 3D rendering, may be used to provide prognostics information pertaining to these moving components.

As can be understood, traditional prognostics procedures typically provide a generic result (such as average life expectancy or a mean time between failures parameter) for components that are apparently identical to each other (such as for example a batch manufactured set of components) without taking into consideration various differences that may exist between these components.

In contrast, the systems and methods disclosed herein can evaluate multiple movable components in an individual capacity, more so when each of these moving components is subjected to motion during operations under various conditions. Furthermore, in accordance with the disclosure, spatial parameters associated with the location of sensing elements are combined with measurement data in a visually friendly manner so as to provide prognostics information of a component on a location by location basis for each component.

References are made herein to block diagrams of systems, methods, apparatuses, and computer program products according to example embodiments of the disclosure. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational elements to be performed on the computer or other programmable apparatus to produce a computer implemented process such that the instructions that execute on the computer or other programmable apparatus provide elements for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method to assess one or more movable components of a turbine, the method comprising:
   subjecting the turbine to a first mode of operation;
   using a sensor system to obtain measurement data by monitoring one or more parameters at a plurality of locations on each of the one or more movable components when the turbine is subjected to the first mode of operation;
   providing to a computing device, input information comprising spatial coordinates information associated with the plurality of locations, the measurement data obtained by the sensor system, operational data associated with the first mode of operation, and structural data associated with the turbine; and
   combining the measurement data and the spatial coordinates information to generate a synthesized representation of at least a first component in the one or more movable components, the synthesized representation of the at least a first component providing a visual indication of one of a failure or a likelihood-of-failure in at least one area when the failure or the likelihood-of-failure is present in the at least one area.

2. The method of claim 1, further comprising:
   processing the input information in the computing device to generate at least one of a first diagnostics report or a first prognostics report on at least the first component, the at least one of the first diagnostics report or the first prognostics report comprising at least one of a failure report, a failure prognostic, or a likelihood-of-failure prognostic of at least a portion of the first component.

3. The method of claim 2, wherein processing the input information data to generate the at least one of the first diagnostics report or the first prognostics report comprises using the synthesized representation of the first component.

4. The method of claim 1, wherein the computing device generates a prediction that one of the first component or a second component is an expected first-to-fail component.

5. The method of claim 4, wherein the prediction comprises a numerical probability of the one of the first component or the second component being the expected first-to-fail component, and further comprises an indication of an expected time-of-failure of the one of the first component or the second component when the turbine is continually subjected to the first mode of operation.

6. The method of claim 1, wherein the one or more movable components comprise a turbine blade, and wherein the computing device generates a statistical probability of failure of a portion of the turbine blade when the turbine is continually subjected to the first mode of operation.

7. The method of claim 6, wherein the computing device generates a revised statistical probability of failure of the portion of the turbine blade if the first mode of operation were to be changed to a second mode of operation.

8. The method of claim 1, wherein the operational data comprises a load profile, and wherein the structural data comprises data indicative of a structural condition of at least the first component prior to subjecting the turbine to the first mode of operation.

9. The method of claim 8, wherein the load profile comprises at least one of a stress imposed on the turbine during the first mode of operation, a temperature associated with the first mode of operation, or an amount of power consumed by the turbine during the first mode of operation.

10. The method of claim 1, further comprising:
    subjecting the turbine to a second mode of operation;

using the sensor system to obtain measurement data by monitoring the one or more parameters at the plurality of locations on each of the one or more movable components when the turbine is subjected to the second mode of operation;

providing to the computing device, imputed data comprising the measurement data obtained by subjecting the turbine to the first mode of operation, operational data associated with the first mode of operation, and structural data associated with the turbine after subjecting the turbine to the first mode of operation; and processing the imputed data and the measurement data obtained when the turbine is subjected to the second mode of operation, to generate at least one of a diagnostics report or a prognostics report on the first component, the at least one of the diagnostics report or the prognostics report comprising at least one of a failure prognostic or a likelihood-of-failure prognostic of the first component due to prior subjecting of the turbine to the first mode of operation.

11. A system for assessing one or more movable components of a turbine, the system comprising:

a sensor system configured to obtain measurement data by monitoring one or more parameters at a plurality of locations on each of one or more movable components of the turbine when the turbine is subjected to a first mode of operation;

a computing device comprising:
 an input interface configured to:
  receive input information comprising spatial coordinates information associated with the plurality of locations, the measurement data obtained by the sensor system, operational data associated with the first mode of operation, and structural data associated with the turbine; and
 a processor configured to:
  combine the measurement data and the spatial coordinates information to generate a synthesized representation of at least a first component in the one or more movable components, the synthesized representation of the at least a first component providing a visual indication of one of a failure or a likelihood-of-failure in at least one area when the failure or the likelihood-of-failure is present in the at least one area.

12. The system of claim 11, wherein the computing device is further configured to process the input information received through the input interface and generate therefrom, at least one of a diagnostics report or a prognostics report on at least the first component of the one or more movable components, the at least one of the diagnostics report or the prognostics report comprising at least one of a failure report, a failure prognostic, or a likelihood-of-failure prognostic.

13. The system of claim 12, wherein the computing device is further configured to use the synthesized representation of the at least one of the one or more movable components to generate the at least one of the diagnostics report or the prognostics report.

14. The system of claim 11, wherein the computing device is configured to generate a prediction that one of the first component or a second component is an expected first-to-fail component.

15. The system of claim 11, wherein the one or more movable components comprise a turbine blade, and wherein the computing device is configured to:

generate a first statistical probability of failure of a portion of the turbine blade when the turbine is continually subjected to the first mode of operation; and generate a revised statistical probability of failure of the portion of the turbine blade if the first mode of operation were to be changed to a second mode of operation.

16. A non-transitory computer-readable storage medium containing instructions executable by a computer for performing operations comprising:

receiving measurement data obtained by monitoring one or more parameters at a plurality of locations on at least a first component of one or more movable components of a turbine, when the turbine is subjected to a first mode of operation;

receiving spatial coordinates information associated with the plurality of locations; and combining the measurement data and the spatial coordinates information to generate a synthesized representation of the first component, the synthesized representation of the first component providing a visual indication of one of a failure or a likelihood-of-failure in at least one area when the failure or the likelihood-of-failure is present in the at least one area.

17. The non-transitory computer-readable storage medium of claim 16, containing further instructions executable by the computer for performing operations comprising:

receiving operational data associated with the first mode of operation;

receiving structural data associated with the turbine; and processing at least one of the measurement data, the operational data, and the structural data and generate therefrom, a prognostics report on at least a first component of the one or more movable components, the prognostics report comprising at least one of a failure prognostic or a likelihood-of-failure prognostic, of the first component.

18. The non-transitory computer-readable storage medium of claim 17, containing further instructions executable by the computer for performing operations comprising:

using the synthesized representation of the at least one of the one or more movable components to generate the prognostics report.

19. The non-transitory computer-readable storage medium of claim 16, containing further instructions executable by the computer for performing operations comprising:

generating a prediction that one of the first component or a second component is an expected first-to-fail component.

20. The non-transitory computer-readable storage medium of claim 16, wherein the one or more movable components comprises a turbine blade, and further comprising instructions executable by the computer for performing operations comprising:

generating a first statistical probability of failure of a portion of the turbine blade when the turbine is continually subjected to the first mode of operation; and generating a revised statistical probability of failure of the portion of the turbine blade if the first mode of operation were to be changed to a second mode of operation.

* * * * *